(12) United States Patent
Michiels et al.

(10) Patent No.: US 7,931,062 B2
(45) Date of Patent: Apr. 26, 2011

(54) PNEUMATIC TIRE WITH LENO CAP PLY AND METHOD OF MAKING SAME

(75) Inventors: Dany F. Michiels, Haaltert (BE); Johann Peschek, Gent (BE); Willy Delanoy, Drongen (BE); Peter Eeckhout, Gent (BE); Boudewijn Snauwaert, Drongen (BE)

(73) Assignee: Milliken & Company, Spartanburg, SC (US)

( * ) Notice: Subject to any disclaimer, the term of this patent is extended or adjusted under 35 U.S.C. 154(b) by 511 days.

(21) Appl. No.: 12/154,996

(22) Filed: May 29, 2008

(65) Prior Publication Data

US 2009/0294008 A1    Dec. 3, 2009

(51) Int. Cl.
*B60C 9/18* (2006.01)
*B29D 30/38* (2006.01)
*B29D 30/70* (2006.01)
*D03D 19/00* (2006.01)

(52) U.S. Cl. .......... 152/533; 139/50; 152/526; 152/531; 156/117; 156/130; 156/148; 442/2; 442/203

(58) Field of Classification Search .................. 152/526, 152/531, 533; 139/50; 156/117, 130, 148; 442/2, 203

See application file for complete search history.

(56) References Cited

U.S. PATENT DOCUMENTS

| | | | |
|---|---|---|---|
| 3,991,803 A | 11/1976 | Praszek | |
| 4,073,330 A | 2/1978 | Allard | |
| 4,201,260 A | 5/1980 | Mirtain et al. | |
| 4,498,514 A | 2/1985 | Maathuis et al. | |
| 4,635,696 A | 1/1987 | Gasowski et al. | |
| 4,739,814 A | 4/1988 | Berczi et al. | |
| 5,032,198 A | 7/1991 | Kojima et al. | |
| 5,365,988 A | 11/1994 | Soderberg et al. | |
| 5,407,701 A | 4/1995 | Reuter | |
| 6,533,012 B1 | 3/2003 | Jardine et al. | |
| 6,799,618 B2 | 10/2004 | Reuter et al. | |
| 7,252,129 B2 | 8/2007 | Michiels et al. | |
| 2006/0185779 A1 | 8/2006 | Michiels et al. | |
| 2007/0267119 A1 | 11/2007 | Michiels et al. | |

FOREIGN PATENT DOCUMENTS

| | | |
|---|---|---|
| EP | 0 624 667 | 11/1994 |
| FR | 2 129 849 | 11/1972 |
| GB | 1 418 558 | 12/1975 |
| GB | 2 139 574 | 11/1984 |
| JP | 9-156326 | 6/1997 |
| KR | 2001-0090127 | 10/2001 |
| KR | 2003-0019978 | 3/2003 |
| RU | 2 209 139 | 7/2003 |
| WO | WO 98/46904 | 10/1998 |
| WO | 99/48706 | 9/1999 |
| WO | 2004/081269 | 9/2004 |
| WO | 2005/002883 | 1/2005 |

*Primary Examiner* — Adrienne C Johnstone
(74) *Attorney, Agent, or Firm* — Cheryl J. Brickey

(57) ABSTRACT

A pneumatic tire containing a tread, a carcass having at least one belt ply disposed below the tread, and a cap ply located between the carcass and the tread. The cap ply comprises at least one layer of an open construction leno weave tape having a pair of warp yarns in the longitudinal direction and a weft yarn in the weft direction. The pair of warp yarns comprises a first warp yarn and a second warp yarn, where the second warp yarn has a force of elongation of between about 1 and 40% the force of elongation of the first warp yarn, where the second warp yarn is in tension, and where the second warp yarn has an elongation at break of greater than 2%. The leno weave tape is disposed in a flat pattern around the circumference of the carcass in the area of the belt ply. A method of making a pneumatic tire is also disclosed.

30 Claims, 5 Drawing Sheets

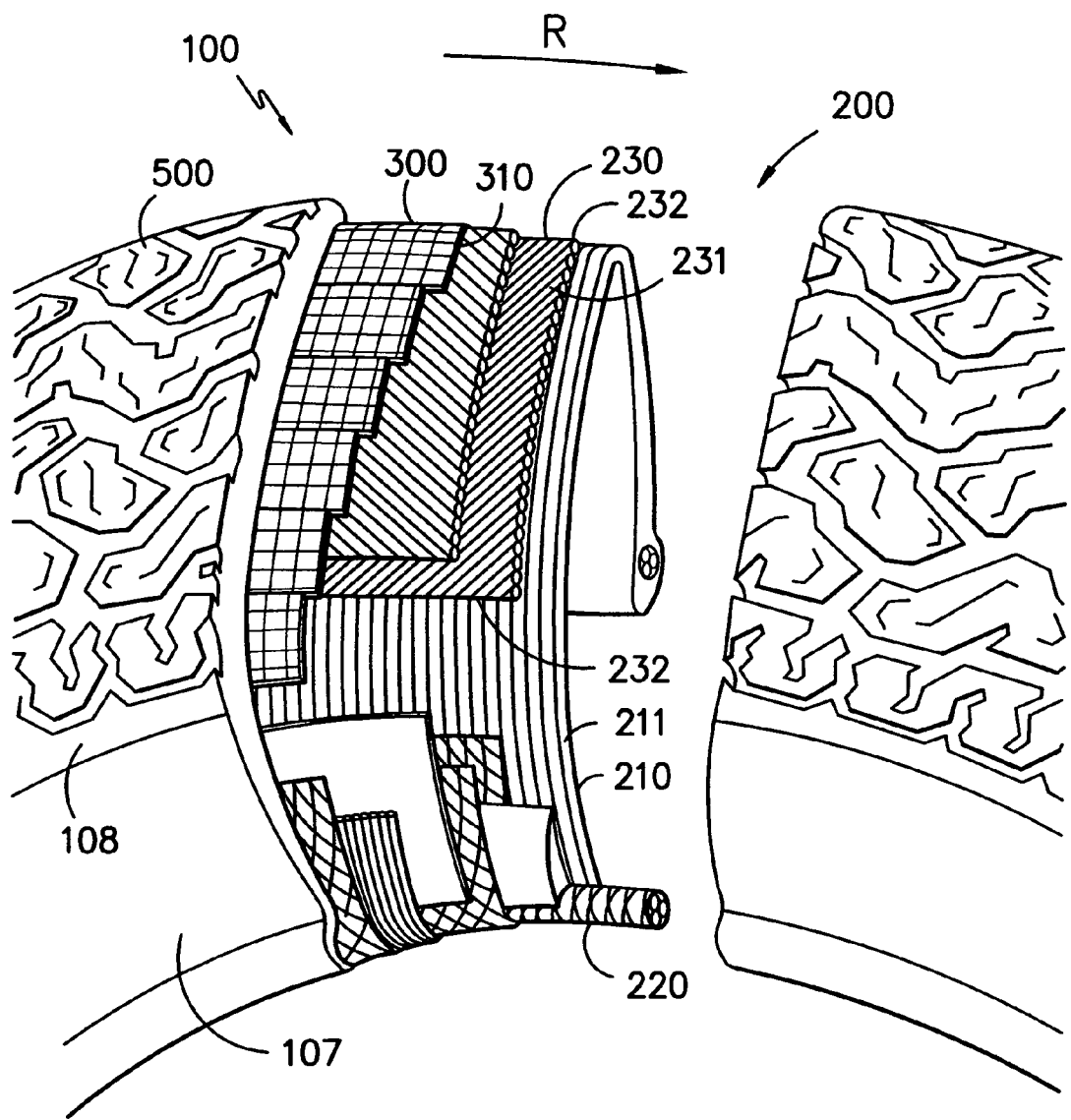
FIG. -1-

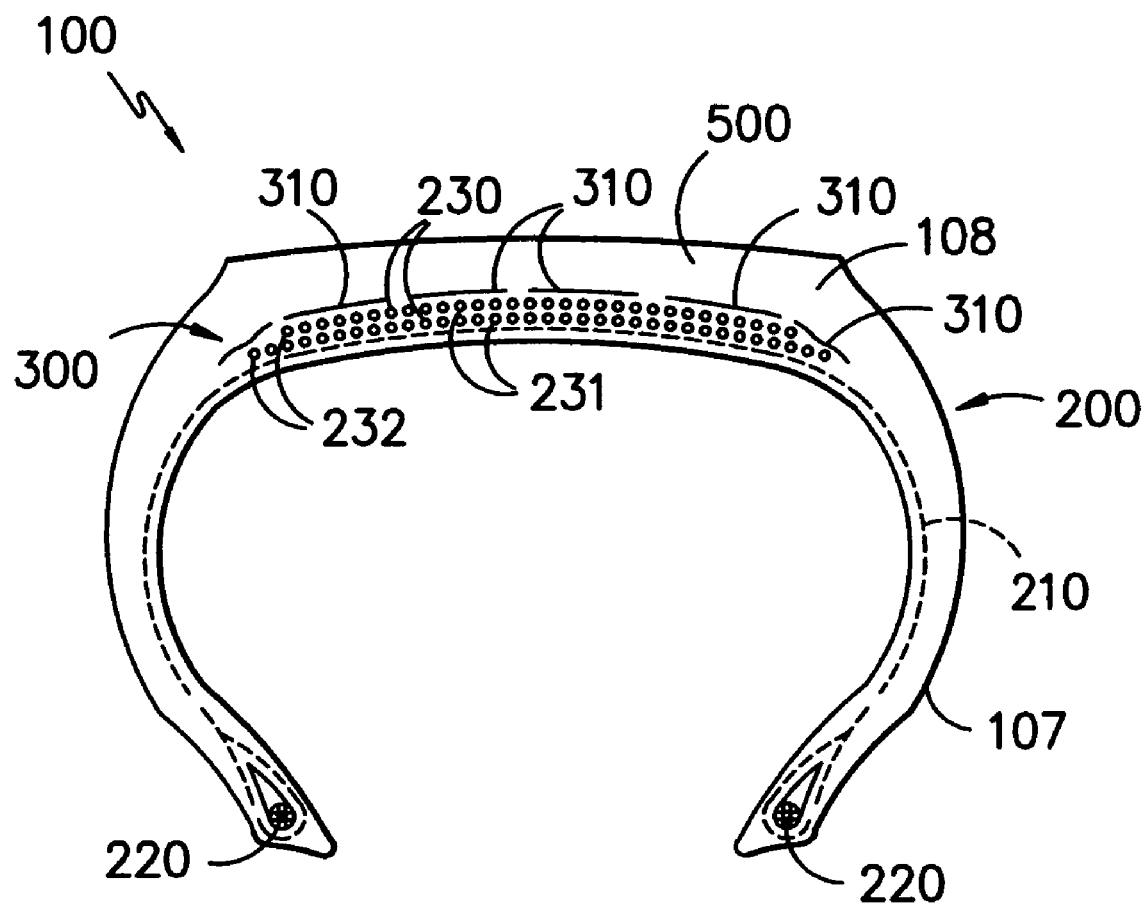
FIG. -2-

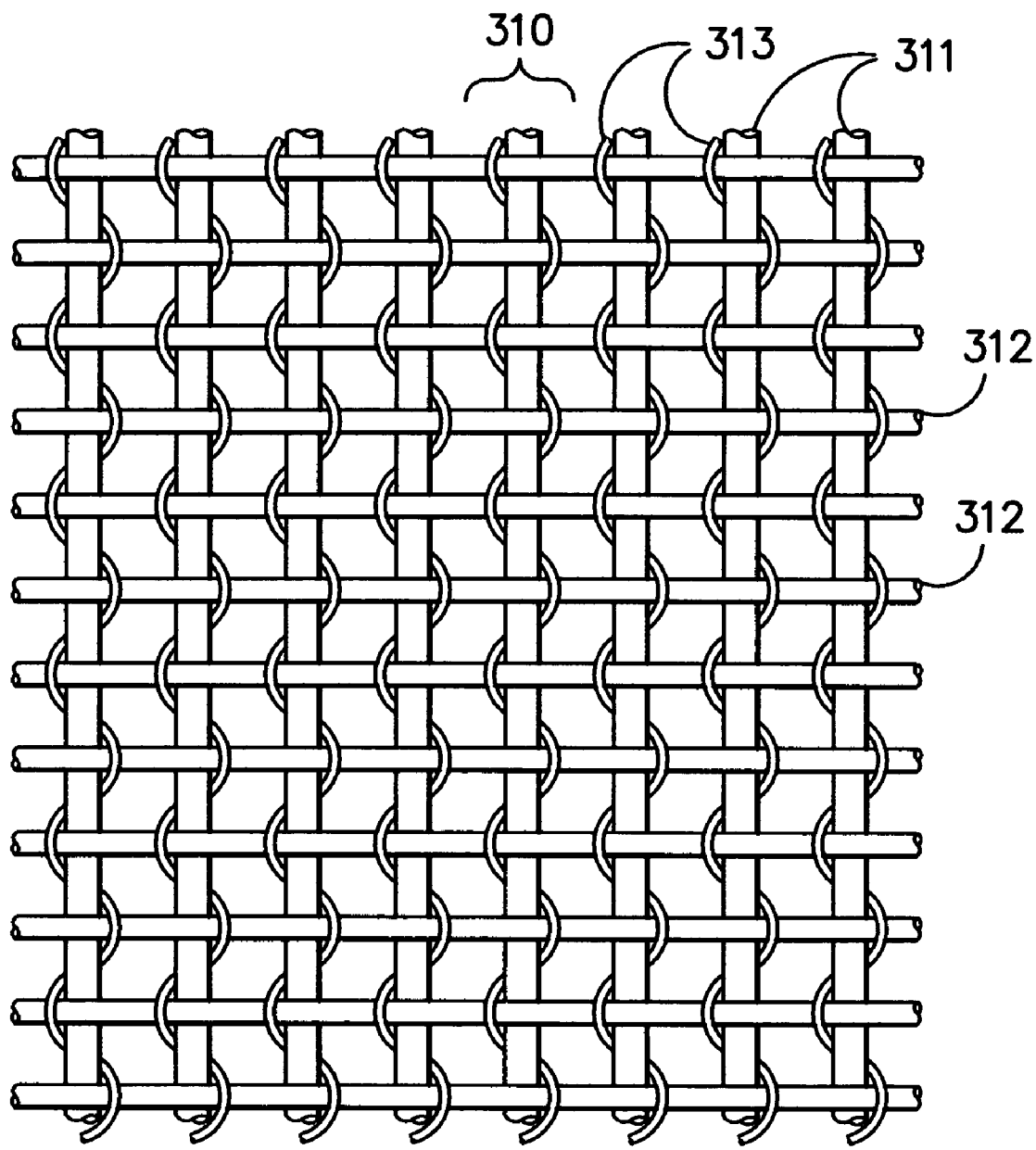
FIG. -3-

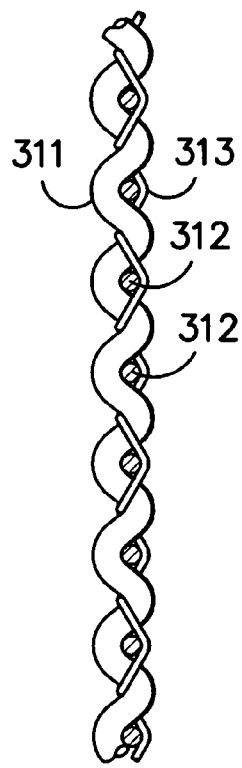
FIG. -4-
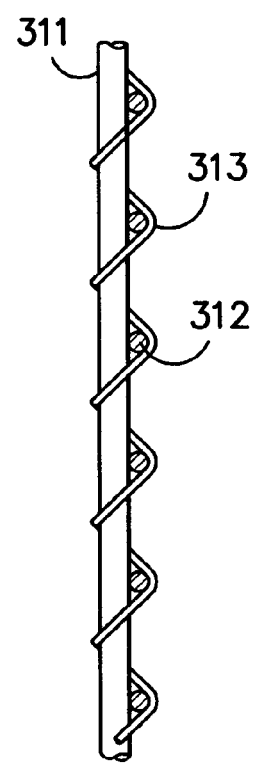
FIG. -5-
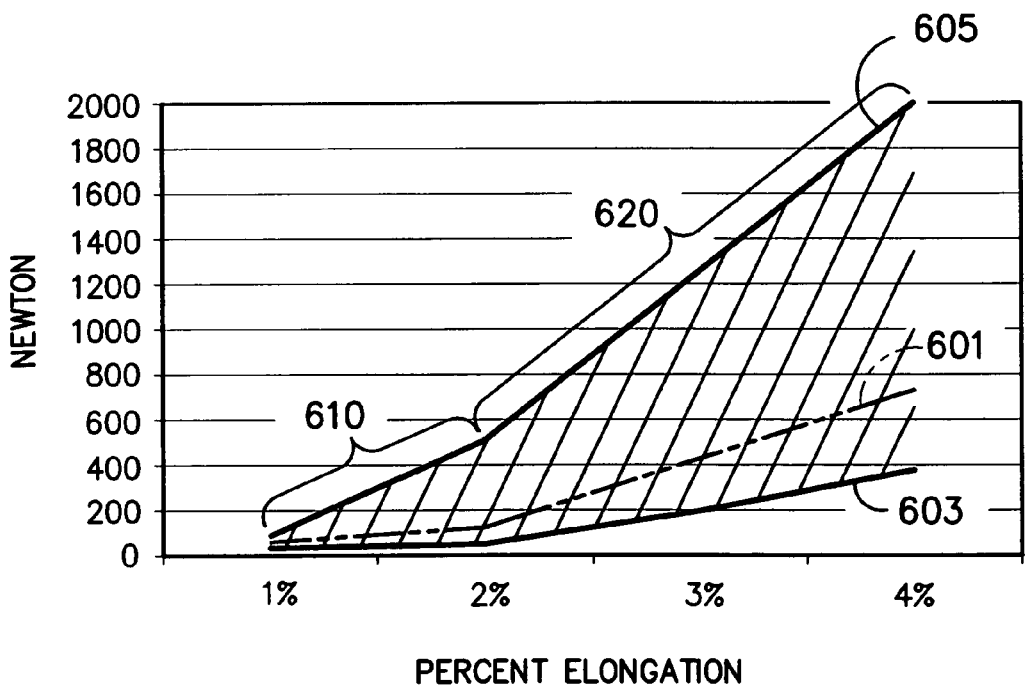
FIG. -6-

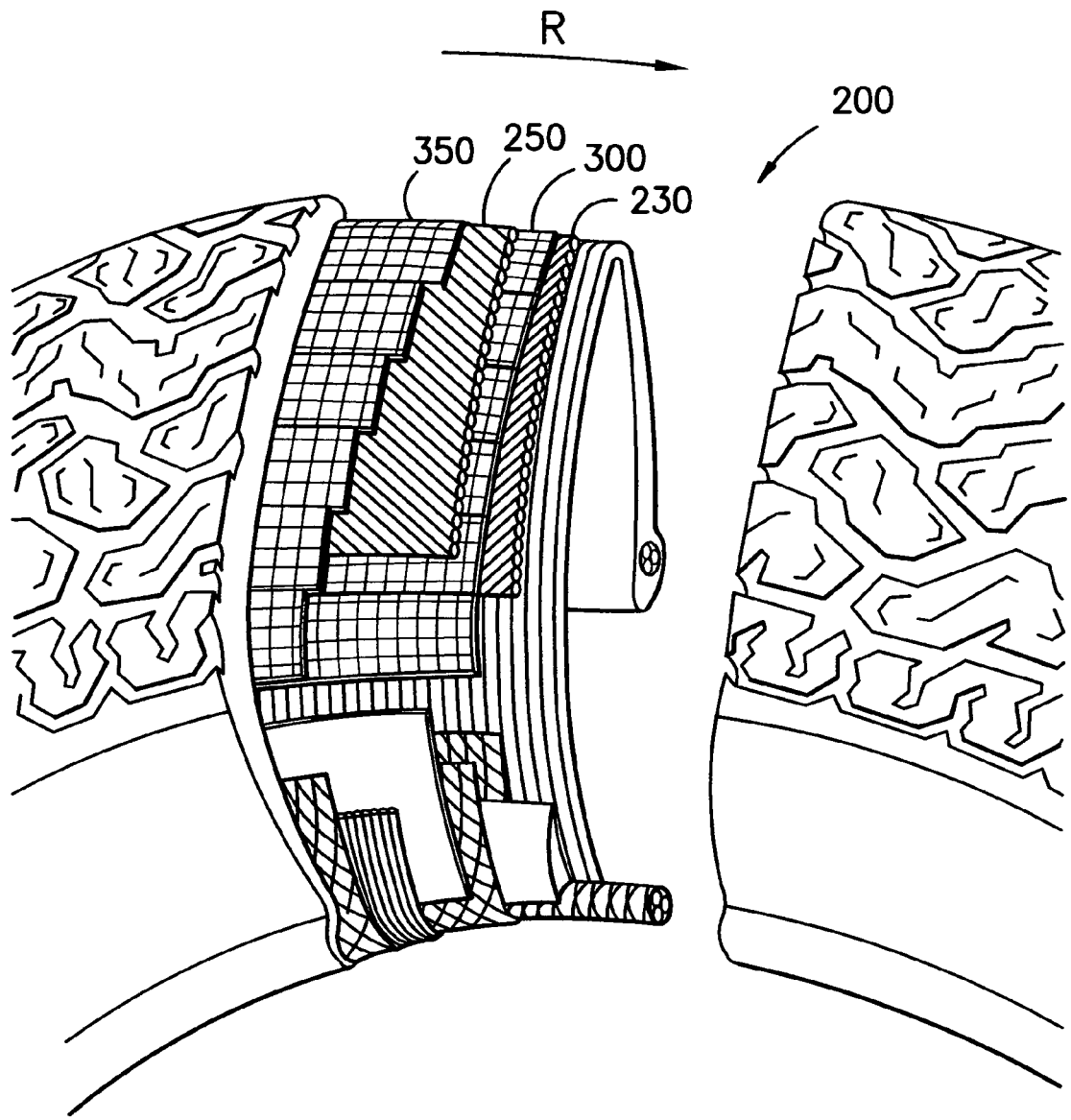
FIG. -7-

PNEUMATIC TIRE WITH LENO CAP PLY AND METHOD OF MAKING SAME

FIELD OF THE INVENTION

The present invention generally relates to pneumatic tires and in particular to construction of ply tires with leno weave cap plies.

BACKGROUND

Typically, tires are manufactured from a single or multiple carcasses of substantially U-shaped sections having metal beads at the inner perimeters of the walls. Support can be provided to a tire carcass by steel cord belt plies extending around the outer periphery of the carcass and across the width of the tread. Such steel belt plies are relatively inextensible in the intended direction of rotation of the tire and include steel belt cords disposed parallel to that direction or at a low angle thereto. The belt plies act to restrict the movement of the tread and give the tire better road-holding properties. Support such as this type is particularly important in a radial tire, where the carcass is formed from a rubberized woven fabric having relatively inextensible reinforcing cords running transversely, i.e. radially, from bead to bead.

Technical difficulties have been encountered in incorporating steel belts into the tread area of the tire. One of the difficulties lies in ensuring good adhesion between the steel and the rubber. The centrifugal force of the steel belts can cause difficulty in the adhesion of the belt within the tire. Additionally, movement of the steel belts at higher speeds tends to create excessive temperatures in the tire, which can cause tread failure and delamination. The problem of delamination is particularly noticeable in the shoulder area of the tire.

One solution of the problem previously used by tire manufactures is to use a layer of calendared fabric laid circumferentially over the belt. This calendared fabric can also be used with wide fabric strips placed over the shoulder area of the tire, retaining the edges of the steel belt in a specific location of the tire. An example of this type of tire can be found in U.S. Pat. No. 4,284,117, issued to Poque et al. on 18 Aug. 1981. In order to cover the entire circumference of the tire and be retained in place, the prior art fabric must overlap itself across the width of tire at some location on the circumference. The overlapping area helps retain the prior art fabric around the circumference of the tire. However, because this type of overlapping adds weight, the potential length of the overlap is limited. A shorter overlap limits the length of the fabric and thereby the strength that the fabric can give to the tire. Additionally, the overlapping section of the fabric causes an uneven thickness of the fabric around the circumference.

To overcome this difficulty, a rubber tape was formed that had cords disposed longitudinally within the tape, and was wound around the belt plies and across the width of the tire. An example of this type of tire can be found in WO 2005/002883, filed by Pirelli Pneumatic S.P.A., and published on 13 Jan. 2005. The continuous nature of the tape provided greater strength. However, the longitudinal yarns were positioned in a spaced apart relationship by the rubber of the tape, which does not provide resistance to the separation of the yarns by items that probe at the area between the yarns.

The present invention provides a solution to obviate or mitigate these difficulties of the prior art.

BRIEF SUMMARY OF THE INVENTION

The invention relates to a pneumatic tire containing a tread, a carcass having at least one belt ply disposed below the tread, and a cap ply located between the carcass and the tread. The cap ply comprises at least one layer of an open construction leno weave tape having a pair of warp yarns in the longitudinal direction and a weft yarn in the weft direction. The pair of warp yarns is comprised of a first warp yarn and a second warp yarn, where the second warp yarn has a force of elongation of between about 1% and 40% the force of elongation of the first warp yarn, where the second warp yarn is in tension, and where the second warp yarn has an elongation at break of greater than 2%. The leno weave tape is disposed in a flat pattern around the circumference of the carcass in the area of the belt ply. A method of making a pneumatic tire is also disclosed.

BRIEF DESCRIPTION OF THE FIGURES

An embodiment of the present invention will now be described by way of example, with reference to the accompanying drawings, in which:

FIG. 1 is a cutaway partial view of a pneumatic radial tire illustrating one embodiment of the invention;

FIG. 2 is a cross-sectional view corresponding to FIG. 1;

FIG. 3 is an enlarged cutaway partial view of a leno tape for use in the tire of FIG. 1;

FIG. 4 is an is an enlarged cutaway side view of a leno tape before tire construction;

FIG. 5 is an is an enlarged cutaway side view of a leno tape after tire construction;

FIG. 6 is a graph illustrating the force versus elongation properties of the leno weave tape;

FIG. 7 is a cutaway partial view of a pneumatic tire according to another embodiment of the present invention.

DETAILED DESCRIPTION

Referring now to the Figures and in particular to FIGS. 1 and 2, there is shown a tire 100, comprising side walls 107 joined to a tread 500 by shoulders 108. The tire 100 includes a carcass 200 covered by the tread 500. In FIGS. 1 and 2, the tire 100 is a radial tire. However, the present invention is not limited to radial tires and can also be used with other tire constructions. The carcass 200 is formed from one or more plies of tire cord 210 terminating at the inner periphery of the tire in metal beads 220, with at least one belt ply 230 located circumferentially around the tire cord 210 in the area of the tread 500. The tire cord 210 is a rubberized woven fabric having its warps formed from relatively inextensible reinforcing cords 211. In the tire shown in FIG. 1, the carcass 200 is constructed so that the reinforcing cords 211 are running substantially radially of the intended direction of rotation R of the tire 100. The belt plies 230 are formed with relatively inextensible warp materials 231, such as steel cord reinforcing warps, which run in the intended direction of rotation R of the tire or, more usually, at a slight angle thereto. The angle of the inextensible warp materials 231 can vary with the method of construction or application. The belt plies 230 extend across the width of the tread 500 of the tire terminating in edges 232 in the area of the shoulder 108 of the tire 100, i.e. the area where the tread 500 meets the side wall 107.

In the present invention, the leno cap ply layer 300 is located between the belt plies 230 and the tread 500. The leno cap ply layer 300 is formed from a leno tape 310 which is wound circumferentially around the carcass 200 of the tire 100 in a flat helical pattern. In one embodiment, the leno tape 310 is wound more frequently at the edges of the tire than the middle of the tire. As illustrated in FIG. 3, the leno tape 310 includes a pair of warp yarns, the first warp yarn 311 and the second warp yarn 313, and weft yarns 312. The leno weave is a weave such that the warp yarns (311, 313) of the warp yarn pairs are arranged with one warp yarn twisted around the other warp yarn between picks of the weft yarn 312. The leno weave gives the leno tape 310 firmness and strength to an open-weave fabric and prevents slippage and displacement of the warp and weft yarns. The first and second warp yarns 311, 313 extend longitudinally along the leno tape 310, which also warp around the carcass 200 due to the wrapping of the leno tape 310 around the carcass 200. It is the first and second warp yarns 311 and 313 that provide most of the reinforcement of the leno cap ply layer 300.

The first warp yarn 311 and the second warp yarn 313 are made of different materials such that the second warp yarn 313 has a force of elongation of between about 1% and 40% of the force of elongation of the first warp yarn 311, the second warp yarn has an elongation at break of greater than 2% and is in tension. Force of elongation is the force needed to elongate the yarn by a fixed amount, or the slope of the stress-strain curve. In a preferred embodiment, the second warp yarn 313 has a force of elongation of between about 1.5% and 20% of the first warp yarn 311 force of elongation. Once woven, the two warp yarns have different amounts of crimp, the second warp yarn has less crimp than the first warp yarn. As can be seen in FIG. 4, when woven the second warp yarn 313 has much less crimp than the first warp yarn 311. One way of accomplishing this is to weave the two warp yarns at different tensions with the second warp yarn at a much higher tension than the first warp yarn 311. This may be accomplished, for example, by using a two-beam leno weave machine. Other ways include, but are not limited to changing the tension on the warp yarns and cap ply layer during dipping, resin treatment, and heat setting. When the leno tape is subsequently subjected to a tensile force, the second warp yarn 313 elongates until the crimp is removed and first yarn 311 is as shown in FIG. 5 in the leno tape 310.

As shown in FIG. 6, the force/elongation curve of the leno tape 310 has a first segment with a lower modulus, and has a transition location to a second segment with a higher modulus. In the early elongation of the leno tape (about 0 to 2%), the modulus of the leno tape is dominated by the modulus characteristics of the second warp yarn 313 as shown as region 610 on the graph. Once the fabric is elongated to the point where the first warp yarn 311 is essentially straight and having essentially no crimp (no crimp being defined herein as no bends in the yarn greater than twice the diameter of the yarn), then the modulus characteristics of the first warp yarns 311 takes over as shown as region 620 on the graph. The elongation of the leno tape during the removal of the crimp of the first warp yarn is represented by the first segment of the curve. The elongation of the leno tape after the crimp of the first warp yarn is removed is represented by the second segment.

FIG. 6 shows the force (in Newtons) per % elongation of the leno tape 310 (where the leno tape has a coating of an adhesion promoter and a tackifier at a weight of 25% of the coated fabric and has 7 ends per centimeter) and has with the upper and lower lines shown illustrating the boundaries for the desired characteristics. The upper 605 and lower 603 bounds illustrate a preferred Newton versus elongation curve for the cap ply leno tape as described above. The line 601 illustrates one preferred cap ply leno tape characteristic for one application. In some embodiments, the coating is on the tape at a weight of between about 2 and 40% of the fabric. Preferably, the 7-end leno tape with coating has the force elongation properties of about 50 to 500N at 2% elongation and about 350 to 2000N at 4% elongation. Preferably, the leno tape 310 has non-elastic deformation. The graph shows an inflection point at approximately 2% elongation between regions 610 and 620. This inflection point may shift due to desired properties of the product, this may be for example between about 1 and 4 percent.

During manufacture of the tire, the leno tape 310 is wound around the carcass. A small amount of elongation is necessary for various processes in the manufacture of the tire, such as so that the cap ply wrapped carcass may be removed from the mandrel where it was wound. The elongation properties of the leno tape 310 in the first segment, as shown in the first segment of the line in FIG. 6, accommodate the minor amount of stretching needed for the tire manufacturing process. The lower line illustrates the lower bound of desired results and the upper line illustrates the upper bound of the desired results. Preferably, this elongation is about 2%. After the wrapped carcass is taken off the mandrel the leno tape 310 is stretched such that the first warp yarn 311 is straightened and a side view of the fabric resembles FIG. 5. In this condition, the leno tape 310 is preferably in a condition that the force per elongation starts at the transition location of the curve in FIG. 6 to provide an increased force for resisting elongation. The increase in force per percent elongation after the transition location is needed to form a structurally sound pneumatic tire.

The first warp yarn 311 is selected such that the yarn provides the desired strength of the leno cap ply layer 300 to prevent the belt ply 230 from moving outward in the tire 100 and to protect the rubber in the tire 100 from sharp portions of the belt plies 230. The first warp yarns 311 can be multifilament yarns and are formed of a material which will restrain the belt plies 230. The first warp yarns preferably have a modulus of between about 25 and 153 GPa, more preferably about 50 to 110 GPa. Yarns with lower modulus might for desired for strength, but may not be desired in some applications because of their large profile. In one preferred embodiment, the first warp yarn 311 comprises aramid. Preferably, the first warp yarn has between about 80 and 300 twists per meter, more preferably about 100 to 250 twists per meter. Varying the twists per meter can affect the force per elongation as shown in FIG. 6. If the first warp yarn has fewer twists the second segment of the graph (from 2% and greater) will have a higher slope and if the first warp yarn has more twists the second segment of the graph (from 2% and greater) will have a more shallow slope.

The second warp yarn 313 provides a crimp in the first warp yarn 311 of the leno tape 310 for manufacturability (with the crimp essentially becoming zero once the cap ply wrapped carcass is removed from the mandrel). The second warp yarn 313 in one embodiment has a modulus of between 5 and 10 GPa. Preferably, the second warp yarn is a nylon (including nylon 6, nylon 6,6, nylon 4,6, nylon 4,10). The second warp yarn 313 preferably has between about 80 and 300 twists per meter, more preferably about 100 to 250 twists per meter.

The weft yarns 312 hold the warp yarns 311 and 313 in the desired spaced apart relationship. The weft yarn 312 can be a spun staple yarn, a multifilament yarn, and/or a monofilament yarn. Preferred examples of suitable materials for the weft yarns 312 include cotton, rayon, polyester, polyamide, aramids (including meta and para forms), nylon, polyvinyl acetate, polyvinyl alcohol, nylon (including nylon 6, nylon 6,6, and nylon 4,6), PBO, and PEN.

The leno tape 310 is constructed with a width preferably of about 5 to 25 millimeters. More preferably, the leno tape 310 is constructed with a width of about 7 to 15 millimeters. The present inventors have discovered that the width of the leno tape 310 is critical to form a uniform flat layer of the leno tape 310 across the surface of the carcass 200 of the tire 100. If the leno tape 310 is used in a helical wrapping process, wider strips will cause buckles on the leading edge of the wrap due to excessive width of the materials. Shorter widths provide difficulties in manufacturing the tire 100 due to an excessive number of revolutions necessary in the wrapping procedure to achieve the desired coverage of the carcass 200 with the leno tape 310.

The leno tape 310 is an open construction fabric which permits the strike through of the rubber in the tire 100 for a better bonded construction. The openness of the fabric used for the leno tape 310 is usually determined by the spacing and character of the first and second warp yarns 311 and 313. The weft yarns 312 are typically spaced as necessary to maintain the position of the warp yarns 311 and 313. Preferably, the fabric has 40-75 warp pairs per decimeter and 10 to 30 weft pairs per decimeter, the first warp yarns are 1100/2 dtex aramid, the second warp yarns are 470/1 dtex nylon, and the weft yarns are 1220/1 dtex rayon.

In one embodiment, the openings formed by the warp yarns and weft yarns are such that the openings will be within about ±5% of the mean opening size. In another embodiment where the fabric is a 54 warp/22 weft per decimeter fabric with the same materials as described above, the pairs of warp yarns 311, 313 are spaced about 0.95 millimeters apart and the weft yarns 312 are spaced about 3.66 millimeters apart to provide a mean opening size of 3.48 mm$^2$. In yet another embodiment where the fabric is a 20 warp/10 weft per decimeter fabric with the same materials for the yarns, the pairs of warp yarns 311 and 313 are spaced about 4.31 millimeters apart and the weft yarns 312 are spaced about 9.94 millimeters apart to provide a mean opening size of 42.84 mm$^2$. In yet another embodiment where the fabric is a 75 warp/30 weft per decimeter fabric with the same materials for the yarns, the pairs of warp yarns 311 and 313 are spaced about 0.43 millimeters apart and the weft yarns 312 are spaced about 2.36 millimeters apart to provide a mean opening size of 1.01 mm$^2$.

If the leno tape 310 is used in a flat helical pattern, the pattern typically will need more than three full revolutions of the leno tape 310 around the carcass 200 of the tire 100. The length of leno tape 310 will depend on the diameter of the tire 100, the width of the leno tape 310, and the amount of coverage provided by the leno tape 310. The approximate minimum length of a leno tape 310 in a leno cap ply layer 300, with only one layer of leno tape 310 and no gaps or over lapping regions, can be calculated according to the following formula:

$$length = 2\pi rw/t$$

where π is 3.14, r is the radius of the tire, w is the width of the area of the tire to be covered, and t is the width of the tape. As an example, for a 185/60/R14 tire, the length of a 13 millimeter wide leno tape 310 would be a minimum of about 15 linear meters in length, and can have an additional amount of about 2-3 meters for overlapping itself in the shoulder area.

Greater strength can be built into the leno tape 310 by constructing the leno tape 310 such that the first and second warp yarns 311 and 313 of the outermost warp yarn pairs in the leno tape 310, run longitudinally for the length of the leno tape 310 as continuous uncut yarns. Even greater strength can be built into the leno tape 310 by constructing the leno tape 310 with all of the first and second warp yarns 311 and 313 run longitudinally the length of the leno tape 310 as continuous uncut yarns.

The leno tape 310 can preferably be treated with an adhesion promoter. Typical examples of adhesion promoters included resorcinol formaldehyde latex (RFL), isocyanate based material, epoxy based material, phenolic resins, and materials based on melamine formaldehyde resin.

The leno tape 310 can also have a tackified finish applied for facilitating adhesion, or green tack, during the building process of the green tire. The selection of materials for the tackified finish will depend greatly upon the materials selected for use in the tire, and the skilled person on the basis of his common knowledge can easily determine them appropriately. Tackified finishes can be achieved by various methods such as coating the fabric in an aqueous blend of rosin and rubber lattices, with a solvent solution of an un-vulcanized rubber compound, or other adhesion promoters.

Preferably, the leno tape 310 is located edge to edge as it is laid on the carcass 200 of the tire 100, and is wrapped around the entire belt ply 230 area of the tire 100. In one embodiment, the leno tape 100 is wrapped around the carcass 200 of the tire 100 such that the leno cap ply layer 300 extends beyond the edges 232 of the belt plies 230, under the shoulder 108 area of the tire 100. Overlapping the edge 232 of the belt 230 with the leno tape 310 provides support to the edges 232 of the belt 230 where excessive temperature can build up.

Additionally, the leno cap ply layer 300 can comprises multiple layers, e.g. two, three, or even more layers, of the leno tape 310 that are wound over the ply layer 230 of the carcass 200 to provide extra strength. In one embodiment, the leno tape 310 is laid into a double layer in the shoulder 108 area of the tire 100, providing additional strength at the edges 232 of the belt 230. In another embodiment, the leno cap ply layer 300 can have two layers of leno tape 310 securing the belt ply 230 across the width of the tire 100. When more than one layer of leno tape 310 is used for the cap ply 300, a layer of unvulcanized rubber is placed between the layers of leno tape 310 to insure a good bond. Also, in an embodiment where multiple layers of the leno tape 310 are used, the layers of leno tape 310 can be staggered so that upper strips of leno tape 310 cover the edges of the leno tape 310 in the lower layer.

The leno cap ply layer 300 of the present invention can be used with one belt ply, two belt plies (as illustrated in FIGS. 1 and 2), or more than two belt plies below the leno cap ply layer 300. In an alternate embodiment of the present invention illustrated in FIG. 7, the tire 100 can have multiple belt plies 230 and 250 with leno cap ply layers 300 and 350, disposed over each belt ply layer creating alternating layers of belt plies and cap plies. In the alternate embodiment, the leno cap ply layer 300 can also overlap the edge of the underlying belt ply, and/or have multiple layers of leno tape 310 (which can also be staggered so that upper strips overlap edges on lower strips).

The formation of the leno tape 310 begins with the acquisition of the basic yarns for the fabric. Subsequently, the yarns are twisted to provide additional mechanical resilience. After the twisting, first warp yarns 311 and the second warp yarns 313 are placed on a two beams for the formation of the fabric. The fabric is formed by leno weaving with the appropriate spacing of the warp yarn pair weaving with the second warp yarns 313 usually in much higher tension than the first warp yarns 311. The fabric is formed in large widths, such as 61.4 inches. After the fabric formation, the fabric is finished with adhesive promoter, such as an RFL treatment. If a tackified finish is desired, this is provided following the adhesive promoter finishing. The final fabric is slit into the specific leno tape 310 widths for placement on a spool. Cross-winding the leno tape 310 across a cardboard tube provides a convenient package for subsequent removal of the leno tape 310 in the manufacturing process of tire 100.

In the tire formation process, the tire carcass 200 is formed with the tire cord 210, metal beads 220, and belt plies 230.

After the tire carcass 200 is formed, the leno tape 310 is wound from the package around the belt plies 230 to form the leno cap ply layer 300. After the leno cap ply layer 300 is placed on the tire carcass 200, the wrapped carcass is removed and the leno cap ply layer is stretched approximately 2% making the first warp yarns 311 have essentially no crimp. The tread 500 is then molded onto the subassembly, and the tire 100 is completed.

The present invention overcomes the difficulties of the prior art. Because of the flat helical pattern of the leno tape, there is no overlap area that extends across the width of the tire. Also, the leno tape is wrapped around the circumference of the tire many times, providing a stronger reinforcement to the belt ply. Furthermore, leno weave of the tape secures the warp yarns to the weft yarns, providing a greater resistance to the separation of the warp yarns.

What is claimed is:

1. A pneumatic tire comprising:
   a tread;
   a carcass having at least one belt ply disposed below the tread; and,
   a cap ply located between the carcass and the tread, wherein the cap ply comprises at least one layer of an open construction leno weave tape having a pair of warp yarns in the longitudinal direction and a weft yarn in the weft direction, wherein the pair of warp yarns comprises a first warp yarn and a second warp yarn, wherein the second warp yarn has a force of elongation of between about 1% and 40% the force of elongation of the first warp yarn, wherein the second warp yarn is in tension, wherein the second warp yarn has a elongation at break of greater than 2%, and wherein the leno weave tape is disposed in a flat pattern around the circumference of the carcass in the area of the belt ply.

2. The pneumatic tire of claim 1, wherein the first warp yarn has essentially no crimp.

3. The pneumatic tire of claim 1, wherein the second warp yarn has a force of elongation of between about 1.5 and 20% the force of elongation of the first warp yarn.

4. The pneumatic tire of claim 1, wherein the leno weave has non elastic deformation.

5. The pneumatic tire of claim 1, wherein the first warp yarn comprises aramid.

6. The pneumatic tire of claim 1, wherein the second warp yarn comprises nylon.

7. The pneumatic tire of claim 1, wherein the first warp yarn has a modulus of about 25 to 153 GPa.

8. The pneumatic tire of claim 1; wherein the first warp yarn has a modulus of about 50 to 110 GPa.

9. The pneumatic tire of claim 1, wherein the second warp yarn has a modulus of about 5 to 10 GPa.

10. The pneumatic tire of claim 1, wherein the first warp yarn and second warp yarn have a twist of between about 80 and 300 twists per meter.

11. The pneumatic tire of claim 1, wherein the cap ply is disposed in a flat helical pattern around the circumference of the carcass in the area of the belt ply.

12. The pneumatic tire of claim 11, wherein the leno weave tape makes more than three full revolutions around the circumference of the tire carcass.

13. The pneumatic tire of claim 1, wherein the cap ply has two or more layers of the leno weave tape.

14. The pneumatic tire of claim 1, wherein the tire further includes a second belt ply placed over the cap ply and a second cap ply layer over the second belt ply and below the tire tread.

15. A pneumatic tire comprising:
    a tread;
    a carcass having at least one belt ply disposed below the tread; and,
    a cap ply located between the carcass and the tread, wherein the cap ply comprises at least one layer of an open construction leno weave tape a pair of warp yarns in the longitudinal direction and a weft yarn in the weft direction, wherein the pair of warp yarns comprises a first warp yarn having a modulus of about 25 to 153 GPa and a second warp yarn having a modulus of about 5 to 10 GPa, wherein the second warp yarn is in tension, wherein the second warp yarn has a elongation at break of greater than 2%, and wherein the leno weave tape is disposed in a flat pattern around the circumference of the carcass in the area of the belt ply.

16. The pneumatic tire of claim 15 wherein the first warp yarn has a modulus of about 50 to 110 GPa.

17. The pneumatic tire of claim 15, wherein the first warp yarn has essentially no crimp.

18. The pneumatic tire of claim 15, wherein the leno weave has non elastic deformation.

19. The pneumatic tire of claim 15, wherein the first warp yarn comprises aramid.

20. The pneumatic tire of claim 15, wherein the second warp yarn comprises nylon.

21. The pneumatic tire of claim 15, wherein the first warp yarn and second warp yarn have a twist of between about 80 and 300 twists per meter.

22. A method of making a pneumatic tire comprising:
    weaving a leno woven fabric comprising at least one layer of an open construction leno weave tape having a pair of warp yarns in the longitudinal direction and a weft yarn in the weft direction, wherein the pair of warp yarns comprises a first warp yarn and a second warp yarn, wherein the second warp yarn has a force of elongation of between about 1 and 40% the force of elongation of the first warp yarn, wherein the second warp yarn is in tension, wherein the second warp yarn has a elongation at break of greater than 2%, such that in the leno woven fabric the first warp yarns have more crimp than the second warp yarns;
    providing a pneumatic tire carcass having at least one belt ply;
    placing the leno woven fabric in a flat pattern around the circumference of the carcass in the area of the belt ply to form a cap ply;
    stretching the leno woven fabric to remove the crimp from the first warp yarns; and,
    applying a tread around the cap ply.

23. The method of claim 22, wherein the leno weave is woven on a two beam leno loom.

24. The method of claim 22, wherein the first warp yarn comprises aramid.

25. The method of claim 22, wherein the second warp yarn comprises nylon.

26. The method of claim 22, wherein the first warp yarn and second warp yarn have a twist of between about 80 and 300 twists per meter.

27. The method of claim 22, wherein the first warp yarn and second warp yarn have a twist of between about 100 and 250 twists per meter.

28. The method of claim 22, wherein the cap ply is wound more frequently at the edges of the tire than the middle of the tire.

29. The method of claim 22, wherein the first warp yarn has a modulus of about 25 to 153 GPa.

30. The method of claim 22, wherein the second warp yarn has a modulus of about 5 to 10 GPa.

* * * * *